Jan. 21, 1958 K. I. ROULSTON ET AL 2,820,903
WIEN BRIDGE OSCILLATOR
Filed April 6, 1955

INVENTORS
Kenneth Irwin Roulston
Cyril Frank Pizzey
By Bailey, Stephens & Huettig
ATTORNEYS United States Patent Office 2,820,903

Patented Jan. 21, 1958

2,820,903

WIEN BRIDGE OSCILLATOR

Kenneth Irwin Roulston, Winnipeg, Manitoba, Canada, and Cyril Frank Pizzey, Beckenham, England, assignors to Elliott Brothers (London) Limited, London, England, a British company Application April 6, 1955, Serial No. 499,700

Claims priority, application Great Britain April 6, 1954

9 Claims. (Cl. 250—36)

Figure 1:
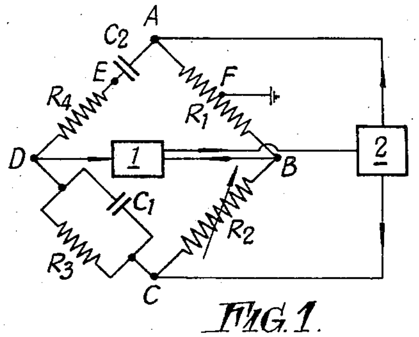

This invention relates to improvements in electrical devices and is particularly concerned with such devices which are capable of providing simultaneously two outputs in quadrature phase relationship.

Electrical devices, such as oscillators, capable of providing simultaneously two outputs in quadrature-phase relationship have been proposed but in order to achieve outputs having good voltage-level/frequency and good quadrature-phase/frequency stability these proposals have embodied relatively complex circuit designs.

It is an object of the present invention to provide an electrical device capable of providing simultaneously two output signals in quadrature phase relationship, having good voltage-level/frequency and good quadrature-phase/frequency stability which shall be relatively simple and economic to manufacture.

According to the broadest aspect of the present invention an electrical device for providing simultaneously two outputs in quadrature phase relationship comprises an oscillator incorporating a Wien bridge network.

In accordance with one feature of the present invention an electric device for providing simultaneously two outputs in quadrauture phase relationship comprises an electric circuit incorporating a Wien bridge network, amplifying means adapted to be supplied with the signal appearing across two points on the network and arranged to produce an output signal capable of being utilised to cause the circuit to oscillate, means for applying this output signal across that diagonal of the bridge network constituted by the junction of each of the resistance arms with an R-C arm and means for picking-off from the bridge network two voltages in quadrature phase relationship.

In a preferred form of the invention an electric device for providing simultaneously two outputs in quadrature phase relationship, comprises an electric circuit incorporating a Wien bridge network in which equal resistances and equal capacitances are provided in the two R-C arms, a differential amplifier having its two inputs connected one to the junction of the R-C arms and the other to the junction of the resistance arms to produce an output signal in phase with the signal appearing across the junctions of the resistance arms with the R-C arms, a phase-splitting device adapted to apply the output of the amplifier to the last mentioned junctions in such a sense as to cause the circuit to oscillate, means connecting to earth the mid-point of that resistance arm making a junction with the series R-C arm, means connected between earth and the last-mentioned junction to make available one of the desired outputs and means connected between earth and the junction of the resistance and the capacitance in the series R-C arm to make available the other of the desired outputs. In this preferred form of the invention the output picked off between the junction of the resistance and the capacitance of the series R-C arm and earth is the difference between the signal appearing across the resistance of the series R-C arm and that appearing across the junction of the resistance arms and earth, and is in quadrature phase with the signal appearing across earth and the junction of the series R-C arm and the respective resistance arm.

Figure 2:
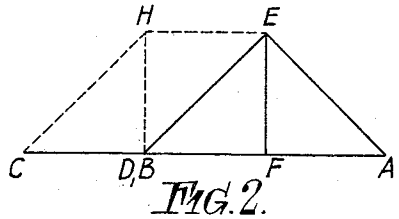
Figure 3:
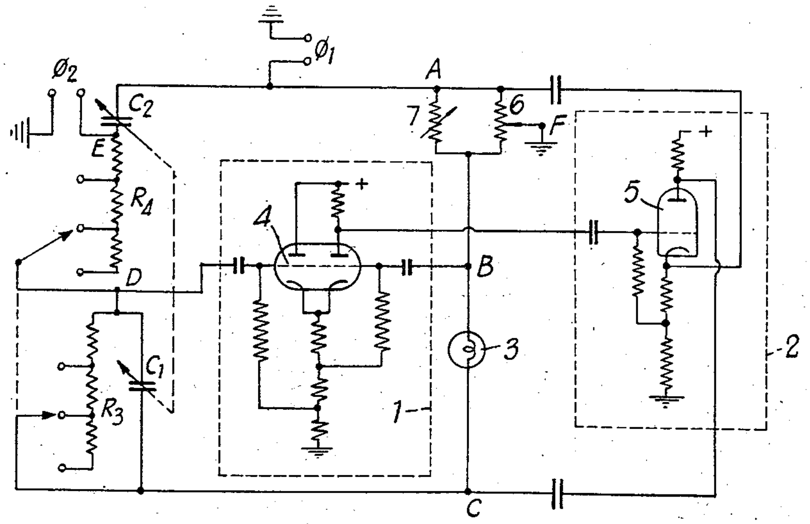

In order that the invention may be clearly understood one form thereof will now be described by way of example with reference to the accompanying drawings in which:

Figure 1 is a block-schematic circuit diagram of an electrical device according to the present invention, Figure 2 is a voltage vector diagram, and Figure 3 is a circuit diagram showing a detailed circuit for the arrangement of Figure 1.

The circuit illustrated in Figure 1 incorporates a Wien bridge network which comprises two resistance arms AB and BC composed of resistances $R_1$ and $R_2$ respectively, a third arm CD composed of a resistance $R_3$ in parallel with a capacitance $C_1$ and a fourth arm DA composed of a resistance $R_4$ in series with a capacitance $C_2$. That end of the resistance $R_4$ remote from the capacitance $C_2$ is connected to the point D and that side of the capacitance $C_2$ remote from the resistance $R_4$ is connected to the point A.

A differential amplyifier 1 has its inputs connected to D and B respectively and its output is fed to the input of a phase-splitter 2 the two outputs of which are fed to the points A and C respectively of the bridge network. When the network is oscillating a signal will appear across DB which is either in phase with or 180° out of phase with that appearing across AC, depending on whether the ratio of $R_1$ to $R_2$ is less or greater than the ratio of the impedance of the series R-C arm AD to the impedance of the parallel R-C arm CD. The amplifier 1 and the phase-splitter 2 are arranged to provide a signal across AC in phase with that appearing there-across (i. e. the feed-back is positive) to cause the circuit to oscillate and the gain of the amplifier 1 and phase-splitter 2 is such as to maintain such oscillations.

It is desirable to limit the amplitude of the oscillations in the circuit in order that any thermionic valves included in the amplifier 1 and the phase-splitter 2 shall be operating on a suitable part of their characteristics so as to reduce to a minimum the harmonic content of the output from the circuit. To this end the resistance $R_2$ is shown as being a variable resistance so that its value may be varied to control the magnitude of the signal fed to the amplifier 1 from the point B in the network and so control the amplitude of the oscillations. In practice however, such an arrangement is not satisfactory and it is preferred that the resistance $R_2$ should be an element having a positive resistance-temperature coefficient, e. g. a tungsten filament lamp as indicated at 3 in Fig. 3 so that the resistance of this element varies automatically with variations in the amplitude of the oscillations and maintains this amplitude stable at a selected value. This value may be chosen by selecting a suitable value for the resistance $R_1$.

When the circuit is switched on, it is shocked into oscillation and the oscillations build up. As the arms AB and BC of the network are resistance arms, the potential at the point B is a function of the amplitude of the oscillations and this is controlled as described above by the resistance $R_2$. As the arms CD and DA of the network are impedance arms, the potential of the point D is a function of the frequency of the oscillations so that this frequency may be controlled by varying the resistance or the capacitance of the arms.

Preferably $R_3$ and $R_4$ are equal in magnitude and $C_1$ and $C_2$ are also equal in magnitude.

Thus the circuit may be made capable of a wide frequency range by making either the resistances $R_3$ and $R_4$ or the capacitances $C_1$ and $C_2$ continuously variable and arranging for the elements not continuously variable to be variable in similar discrete steps e. g., steps of 10:1.

The capacitances $C_1$ and $C_2$ are preferably ganged together as are also the resistances $R_3$ and $R_4$. It is preferred that the capacitances $C_1$ and $C_2$ should be continuously variable.

The vector diagram of Figure 2 shows the voltages appearing across various parts of the bridge circuit of Figure 1 when $R_3=R_4$ and $C_1=C_2$ and the vectors are lettered to correspond with Figure 1.

It is known that the frequency of oscillation of the network $$f=\frac{1}{2\pi R_4 C_2}$$

so that in the vector diagram $/DE/=/BA/$ and if F is taken as the mid-point of the resistance $R_1$ then $\overline{BF}=\overline{FA}$. B coincides with D when the network is substantially balanced and by taking the difference between the vectors $\overline{DE}$ and $\overline{BF}$ the vector FE is obtained which is at right-angles to $\overline{FA}$ and $\overline{FB}$ and is equal in magnitude to them. Thus one method of obtaining a voltage in quadrature with the voltage appearing across AC is to obtain the difference between the voltages appearing across DE and BF.

Further since $R_3=R_4$, $/DC/=/BF/$. By adding the vectors $\overline{BC}$ and $\overline{DE}$ a vector BH is obtained which is at right angles to $\overline{BC}$ and $\overline{BF}$ and is equal in magnitude to them. Thus an alternative method of obtaining a quadrature voltage is to add the voltages appearing across BC and DE.

The simplest arrangement of the two-phase oscillator is obtained when the point F is earthed as shown in Figure 1. It will be apparent from Figure 2 that two voltages in quadrature-phase relationship are then obtained between E and earth and A and earth respectively.

The detailed circuit shown in Figure 3 makes use of this and includes a double-triode valve 4 in the circuit of the differential amplifier 1 and a triode valve 5 in the circuit of the phase-splitter 2. The double-triode 4 may, if desired, be replaced by two separate triode valves. Since F is earthed the voltage between A and earth is one half of that appearing between C and earth and it is preferred to feed the point A from the cathode of the phase-splitter 2 rather than from the anode on account of the lower impedance between A and earth. The ratio of the cathode load to the anode load of the phase-splitter is preferably of the order of 1:2.

In this circuit arrangement the resistance $R_1$ between A and B (Fig. 1) is replaced by a potentiometer 6 in parallel with a variable resistance 7. If desired the resistances 6 and 7 may be in series in which case the resistance 7 is connected to the point B. The latter is used as an oscillation amplitude control and the potentiometer 6 provides means for adjusting the earth point of the bridge circuit and thus the phase-angle. The output voltages in quadrature-phase relationship are picked-off between earth and the points A and E respectively as indicated by $\varphi_1$ and $\varphi_2$. The capicitances $C_1$ and $C_2$ are ganged to provide means for varying the frequency of oscillation of the circuit. The operation of the circuit illustrated in Figure 3 will be apparent having regard to the foregoing description. It is preferred that the phases picked off at $\varphi_1$ and $\varphi_2$ should each be taken through a buffer valve (not shown) such as one or more cathode follower stages to prevent any variations in the constants of an external circuit supplied with those phases from affecting the operation of the oscillatory circuit described.

The advantages of the arrangement described over the known phase-shift oscillator are (i) the reduced number of variable elements necessary to change the frequency, four being required for the known phase-shift oscillator to give the output voltages in quadrature phase relationship over a considerable frequency range, and (ii) the equality in amplitude of the two phases in quadrature relationship.

What we claim is:

1. An electrical device for providing simultaneously two outputs in quadrature phase relationship comprising an electric circuit incorporating a Wien bridge network in which equal resistances and equal capacitances are provided in the two R-C arms, a differential amplifier having its two inputs connected one to the junction of the R-C arms of the network and the other to the junction of the resistance arms of the network to produce an output signal in phase with the signal appearing across the junctions of the resistance arms with the R-C arms, a phase-splitting device connected between the output of the amplifier and the last-mentioned junctions to apply the output of the amplifier to said last-mentioned junctions in such a sense as to cause the circuit to oscillate, means connecting to earth the mid-point of that resistance arm making a junction with the series R-C arm, means connected between earth and the last-mentioned junction to make available one of the desired outputs and means connected between earth and the junction of the resistance and the capicitance in the series R-C arm to make available the other of the desired outputs.

2. A device according to claim 1 wherein the phase-splitting device comprises an electronic valve having at least a cathode, an anode and a control grid, and the anode is connected to the junction of one resistance arm with the parallel R-C arm and the cathode is connected to the junction of the other resistance arm with the series R-C arm.

3. A device according to claim 2 wherein the ratio of the cathode load to the anode load of the phase-splitting device is of the order of 1:2.

4. A device according to claim 1 wherein that resistance arm making a junction with the parallel R-C arm includes a resistance element having a positive resistance-temperature coefficient.

5. A device according to claim 4 wherein the resistance element is a tungsten filament lamp.

6. An electrical device for providing simultaneously two outputs in quadrature phase relationship comprising an electric circuit incorporating a Wien bridge network in which equal resistances and equal capacitances are provided in the two R-C arms, the one resistance arm making a junction with the series R-C arm is composed of two resistances connected in parallel, one of which two resistances is variable and the other of which has a variable tapping connected to earth, and the other resistance arm making a junction with the parallel R-C arm includes a resistance element having a positive resistance-temperature coefficient, a differential amplifier having its two inputs connected one to the junction of the R-C arms and the other to the junction of the resistance arms to produce an output signal, an electronic valve having at least an anode, a cathode and a control grid, means connecting the control grid to the output of the differential amplifier, a load connected to the anode, a load connected to the cathode, the ratio of the cathode load to the anode load being of the order of 1:2, means connecting the anode to the junction of said other resistance arm with the parallel R-C arm, means connecting the cathode to the junction of said one resistance arm with the series R-C arm, means connected between earth and the last-mentioned junction to make available one of the desired outputs, and means connected between earth and the junction of the resistance and the capacitance of the series R-C arm to make available the other of the desired outputs.

7. An electrical device for providing simultaneously two outputs in quadrature phase relationship comprising an electric circuit incorporating a Wien bridge network, a differential amplifier having its two inputs connected one to the junction of the R-C arms of the network and the other to the junction of the resistance arms of the network to produce an output signal in phase with the signal appearing across the junctions of the resistance arms with the R-C arms, a phase-splitting device connected between the output of the amplifier and the last-mentioned junctions to apply the output of the amplifier to said last mentioned junctions in such a sense as to cause the circuit to oscillate, means connecting to earth an intermediate point of that resistance arm making a junction with the series R-C arm, such that the voltage appearing between earth and the junction of the resistance and capacitance in the series R-C arm is in phase-quadrature with the voltage appearing across at least a part of at least one of the resistance arms, means connected between earth and the junction of the resistance and the capacitance in the series R-C arm to make available one of the desired outputs and means connected across at least a part of one of the resistance arms to make available the other of the desired outputs.

8. An electrical device for providing simultaneously two outputs in quadrature phase relationship comprising an electric circuit incorporating a Wien bridge network in which equal resistances and equal capacitances are provided in the two R-C arms, a differential amplifier having its two inputs connected one to the junction of the R-C arms of the network and the other to the junction of the resistance arms of the network to produce an output signal in phase with the signal appearing across the junctions of the resistance arms with the R-C arms, a phase-splitting device connected between the output of the amplifier and the last-mentioned junctions to apply the output of the amplifier to said last mentioned junctions in such a sense as to cause the circuit to oscillate, means connecting to earth the midpoint of that resistance arm making a junction with the series R-C arm, means connected between earth and the junction of the resistance and the capacitance in the series R-C arm to make available one of the desired outputs and means connected across that resistance arm making a juntcion with the parallel R-C arm to make available the other of the desired outputs.

9. An electrical device for providing simultaneously two outputs in quadrature phase relationship comprising an electric circuit incorporating a Wien bridge network, a differential amplifier having its two inputs connected one to the junction of the R-C arms of the network and the other to the junction of the resistance arms of the network to produce an output signal in phase with the signal appearing across the junctions of the resistance arms with the R-C arms, a phase-splitting device connected between the output of the amplifier and the last-mentioned junctions to apply the output of the amplifier to said last mentioned junctions in such a sense as to cause the circuit to oscillate, means connecting to earth an intermediate point of that resistance arm making a junction with the series R-C arm, such that the voltage appearing between earth and the junction of the resistance and capacitance in the series R-C arm is in phase-quadrature with the voltage appearing across at least a part of at least one of the resistance arms, means connected between earth and the junction of the one resistance arm with the series R-C arm to make available one of the desired outputs and means connected between earth and the junction of the resistance and the capacitance in the series R-C arm to make available the other of the desired outputs.

References Cited in the file of this patent

UNITED STATES PATENTS 2,444,084 Artzt ---------------- June 29, 1948

FOREIGN PATENTS 644,083 Great Britain ------------ Oct. 4, 1950

OTHER REFERENCES

A Tunable Audio-Freq. Ampli., by Shaw in Journal, Scientific Instruments, November 1950, vol. 27, issue No. 11, pages 295–298.